(12) United States Patent
Li

(10) Patent No.: US 6,521,318 B1
(45) Date of Patent: Feb. 18, 2003

(54) OPTICAL DISK DEVICE AND METHOD

(76) Inventor: Yiwei Li, Unit 9, 50 Beamish Street, Campsie, New South Wales, 2194 (AU)

( * ) Notice: Subject to any disclaimer, the term of this patent is extended or adjusted under 35 U.S.C. 154(b) by 0 days.

(21) Appl. No.: 09/786,068

(22) PCT Filed: Sep. 17, 1999

(86) PCT No.: PCT/AU99/00794
§ 371 (c)(1),
(2), (4) Date: Feb. 28, 2001

(87) PCT Pub. No.: WO00/17881
PCT Pub. Date: Mar. 30, 2000

(30) Foreign Application Priority Data

Sep. 17, 1998 (AU) .......................................... PP 5992/98

(51) Int. Cl.[7] .................................................. B32B 3/02
(52) U.S. Cl. ...................... 428/64.1; 428/64.4; 428/64.8
(58) Field of Search ................................ 428/64.1, 64.4, 428/64.8, 457, 913; 430/270.11, 495.1, 945; 369/275.1, 283

(56) References Cited

U.S. PATENT DOCUMENTS

| 5,190,800 A | 3/1993 | Yamada et al. ................ 428/64 |
| 5,855,979 A | 1/1999 | Umehara et al. ........... 428/64.1 |
| 6,329,035 B1 * | 12/2001 | Iwasaki ...................... 428/64.1 |

* cited by examiner

*Primary Examiner*—Elizabeth Mulvaney
(74) *Attorney, Agent, or Firm*—Cesari and McKenna, LLP

(57) ABSTRACT

The present invention accordingly to one aspect seeks to provide an improved disk device wherein, a single- or multi-layered structure of like or unlike material(s) are contained within or upon the optical disk giving the effect of assisting in the recognition of information contained within the optical disk. In a preferred form of the invention it is sought to provide an optical disk wherein, a first layer of material is placed upon a surface of an optical disk opposite to the laser source, the first layer being composed of a material which substantially reflects an incident laser light, and, a second layer of material is placed over the first layer and upon the surface of the optical disk except in the area required by the laser source to access the region containing the pit encoding, the second layer being composed of a material which substantially absorbs the incident laser light.

15 Claims, 6 Drawing Sheets

OPTICAL DISK DEVICE AND METHOD

TECHNICAL FIELD

The present invention relates to a new type of optical disk and a method for implementing the effects of the new device on existing optical disks, and in particular, to an optical disk with improved digital or analog signal reproduction from the optical disk coding by an optical reading assembly. Both the device and the method of the present invention extend to all forms of optical disk including, but not limited to prerecorded, recordable, rewriteable (magneto-optical) and other forms of optical disk.

BACKGROUND ART

Presently, optical disks consist of a layered structure 1 as shown in FIG. 1. In an optical disk player, laser light 2 from a laser diode is focused by the action of a series of lenses, and the transparent polycarbonate layer 3 itself, onto a reflective surface 4. The reflected light is then passed back into the optical system and separated, usually by a quarter-wave polarising plate or a half mirror, then detected by a series of photodiodes. By way of fast action servo systems, voltage levels from photodiodes control an objective lens to keep the focused region of the laser beam in alignment with the desired part of the optical disk.

The depth of the pits 5 is important for the operation of the disk. Pits are generally made a quarter of the laser light wavelength in depth. As the laser light is coherent and the reflected light from the region in-between the pits, defined as the land-region 6, travels an extra half wavelength compared to light from the reflective surface of the pits 4 which results in a degree of annihilation of the reflected light.

Thus, pit edges and surrounding land-regions are indicated by a low level of reflectance intensity, however, when the laser beam is focused on the reflective coating a strong reflective signal is obtained. This discrimination process leads to the reading of the information on an optical disk.

To further illustrate this, FIG. 2 shows laser light 2 from a light source positioned over a pit 5. Reflected laser light from near the pit edge at position 7 is a half-wavelength out of phase with reflected laser light from the position 8 if the depth of the pit 5 is a quarter of the wavelength of the laser light. Hence, reflected laser light from the periphery regions of a pit 5 and corresponding regions adjacent the pit, that is at the edge of land-regions 6, is low in intensity due to superpositioning of the 180° out of phase reflected coherent laser light. It is these nulls in light intensity which are manifested as the information on the optical disk.

Digital optical disks may use a pit format which uses a master clock to identify information based on time-length. Normally, the master clock period is denoted T, then the smallest pit-length or land-length (that is the region between pits) is denoted 3T, then 4T, 5T, etc. The longest pit-length or land-length is denoted as 11T. These pit-lengths and land-lengths are a common element in present-day digital technology. Normally, the smallest pit-length period 3T is '1' in computer binary; 4T is '11' in computer binary; and so on, they represent the positive waveform. The smallest land-length period 3T is '0' in computer binary; 4T is '00'; and so on, they represent the negative waveform. In a typical format, an analog waveform is completely represented by an eighteen digit word.

The protective film 9, shown in FIG. 1, is typically used to prevent damage to the pits which are in close proximity to the surface, and to allow a label to be imprinted onto the disk. The reflective information layer of some optical disk formats allow single-layer, dual-layer or multi-layer films on one side of disk. The analog tracks of an optical disk are recorded with small precise pits having variation in depth in the disk surface.

It is the variation in the intensity of reflected light which allows reproduction of the information contained within the disk as a configuration of pits to be reproduced electronically via the photodiodes. Inherent variations in reflection coefficients in the disk device can introduce undesirable noise levels, which if significant will result in misread or lost information.

Patent document U.S. Pat. No. 5,190,800 teaches of an optical recording medium having a substrate which contains a light absorbent capable of absorbing light other than the light used for recording and reproducing. This light filtering mechanism affects the overall transmittance of various wavelengths of light incident on the substrate but does not provide an enhanced means for edge (pit and land) identification in the optical recording medium. The document does not disclose a means for addressing the effects of reflected or refracted laser light inside the optical disk. Indeed, it is an object of this document to provide an optical recording medium which does not suffer from deterioration by ordinary light, rather than aid in the reproduction of signals by enhanced edge (pit and land) identification from the optical recording medium. Neither does the presence of a recording layer, light reflective layer or protective layer assist in this respect. These components are standard features of optical disks today and are not directed at assisting in edge (pit and land) identification at the recording and light reflective layers.

A brief outline of current optical disk technology, which is applicable to the present invention, follows. A recordable optical disk is typically structured as shown in FIG. 3. There is a thin exposed layer 10 and a reflecting layer 11. The reflecting layer 11 is positioned behind the exposed layer 10 and opposite the laser source. The reflecting layer 11 replaces the reflective surface 4 of FIG. 1. A short pulse of laser light is used to burn a spot on the exposed layer 10 when the material is in its amorphous state. These spots can create a 'pit' of a desired length.

Magneto-optical disks, also called erasable rewriteable-optical disks, are based on a hybrid of optical disk technology and magnetic disk technology. The thin exposed layer 10, of FIG. 3, is in this case a material which allows its magnetic state to be changed when heated to a certain temperature. Thus, this material replaces the thin exposed layer of a recordable laser disk. A low power laser is used to read the 'pits' by detecting magnetic spots on the disk. The spots also keep the magnetic field direction they developed when heated. Another higher power laser is used to heat spots which thus change their magnetic state, hence making the 'pits' erasable.

Hence, there are different formats of laser optical disk, the structures having different reflecting layers which may reflect a particular wavelength of the incident laser light. Modern lasers for optical disks often have automatic gain control circuits which help the opto-electronics read from the different reflecting layers. The basic format variations of the standard CDs family of optical disks include: Audio CD, CD-ROM, Video CD, CD-I, CD-R, CD-RW, Photo CD, CD-G, MovieCD, etc.

The detecting sensor (photodiode) is very important in laser optical technology. However, the photodiode does not detect what wavelength of light is reflected by the target. Additionally, the photodiode does not discriminate between light that is reflected or refracted by materials outside of the target, thus an ambiguous light signal may be obtained. This is the basis of a large proportion of errors being readout from the information on a disk.

Reduction of noise levels, that is a dither effect from pit reflection, induced by opto-electronics reading optical disks, and by the structure of the optical disks themselves, is an important issue. Besides improving the quality of sound and removing reading errors, improved identification of edge regions will allow a clear contrast between a pit-edge and a land-edge to be observed which may allow a higher density of digital information to be contained within an optical disk.

This identifies a need for an improved optical disk wherein higher reflected optical intensities and/or contrasts lead to both an improved tracking stability and significant noise reduction.

There is also a need to provide a method of achieving the effects of such an improved optical disk by applying the method to existing optical disks.

DISCLOSURE OF INVENTION

The present invention according to one aspect seeks to provide an improved optical disk device including:

an optical disk;

a first layer of material disposed upon at least a portion of the surface of the optical disk opposite to a laser source, the first layer of material able to substantially reflect laser light from the laser source;

a second layer of material(s) disposed over at least the first layer of material, the second layer of material(s) able to substantially absorb the laser light; and a third layer of material disposed upon at least a portion of the surface of the optical disk adjacent to the laser source, the third layer of material able to substantially reflect laser light from the laser source.

In another preferred form of the invention it sought to provide that the first layer of material covers an area of the surface of the optical disk corresponding to at least the region of the optical disk used for pit encoding; and the second layer of material(s) covers at least the first layer of material and the third layer of material.

The present invention according to another aspect seeks to provide that the third layer of material is excluded from the surface area of the optical disk required by the laser source to access the region of the optical disk containing the pit encoding.

The present invention according to yet another aspect seeks to provide that the second layer of material(s) is also disposed upon at least part of the lateral edges of the optical disk.

Preferably:

the first layer of material is substantially red in colour;

the second layer of material(s) is substantially green, blue or combinations thereof in colour(s);

the third layer of material is substantially red in colour.

In a broad form, the present invention provides that the layers of materials are embedded within the optical disk in regions or areas thus providing a similar effect as if the layers were disposed upon the surface of the optical disk.

In a further embodiment of the present invention there is provided a method of reducing errors when an opto-electronic system reads an optical disk, said method including the steps of:

depositing a first layer of material upon at least a portion of the surface of the optical disk opposite to a laser source, the first layer of material able to substantially reflect laser light from the laser source;

depositing a second layer of material(s) over at least the first layer of material, the second layer of material(s) able to substantially absorb the laser light; and depositing a third layer of material upon at least a portion of the surface of the optical disk adjacent to the laser source, the third layer of material able to substantially reflect laser light from the laser source;

whereby the presence of the first, second and third layers of materials facilitates increased recognition of pit edges by the opto-electronic system than would otherwise be obtained if the layers of materials were not present.

In another preferred form of the invention there is provided a method wherein:

the first layer of material covers an area of the surface of the optical disk corresponding to at least the region of the optical disk used for pit encoding; and the second layer of material(s) covers at least the first layer of material and the third layer of material.

In yet another preferred form of the invention there is provided a method wherein, the third layer of material is excluded from the surface area of the optical disk required by the laser source to access the region of the optical disk containing the pit encoding.

In still yet another preferred form of the invention there is provided a method wherein, the second layer of material(s) is also disposed upon at least part of the lateral edges of the optical disk.

Preferably, the present invention also provides a method wherein:

the first layer of material is substantially red in colour;

the second layer of material(s) is substantially green, blue or combinations thereof in colour(s);

the third layer of material is substantially red in colour.

Broadly, the present invention seeks to provide a method wherein, the layers of materials are embedded within the optical disk in regions or areas thus providing a similar effect as if the layers were disposed upon the surface of the optical disk.

Furthermore, the present invention seeks provide that the optical disk includes standard, pressed (pre-recorded), recordable, rewriteable (magneto-optical) or other forms of optical disk, and includes disk formats from the CD family of optical disks such as standard CD, Audio CD, CD-ROM, Video CD, CD-I, CD-R, CD-RW, Photo CD, CD-G, Movi-eCD and other related formats.

Improved optical disk device, substantially according to the embodiment described in the specification with reference to and as illustrated in the accompanying figures.

In yet a further broad form of the present invention, the present invention seeks to provide a method of reducing errors when an opto-electronic system reads an optical disk, substantially according to the embodiment described in the specification with reference to the accompanying figures.

BRIEF DESCRIPTION OF THE FIGURES

The present invention will become more fully understood from the following detailed description of a preferred but non-limiting embodiment thereof, described in connection with the accompanying drawings, wherein.

MODES FOR CARRYING OUT THE INVENTION

To properly explain the present invention, factors which give rise to deviations from an ideal square wave in the digital waveform output of opto-electronics reading an optical disk should initially be considered. A brief description follows.

Figure 1:
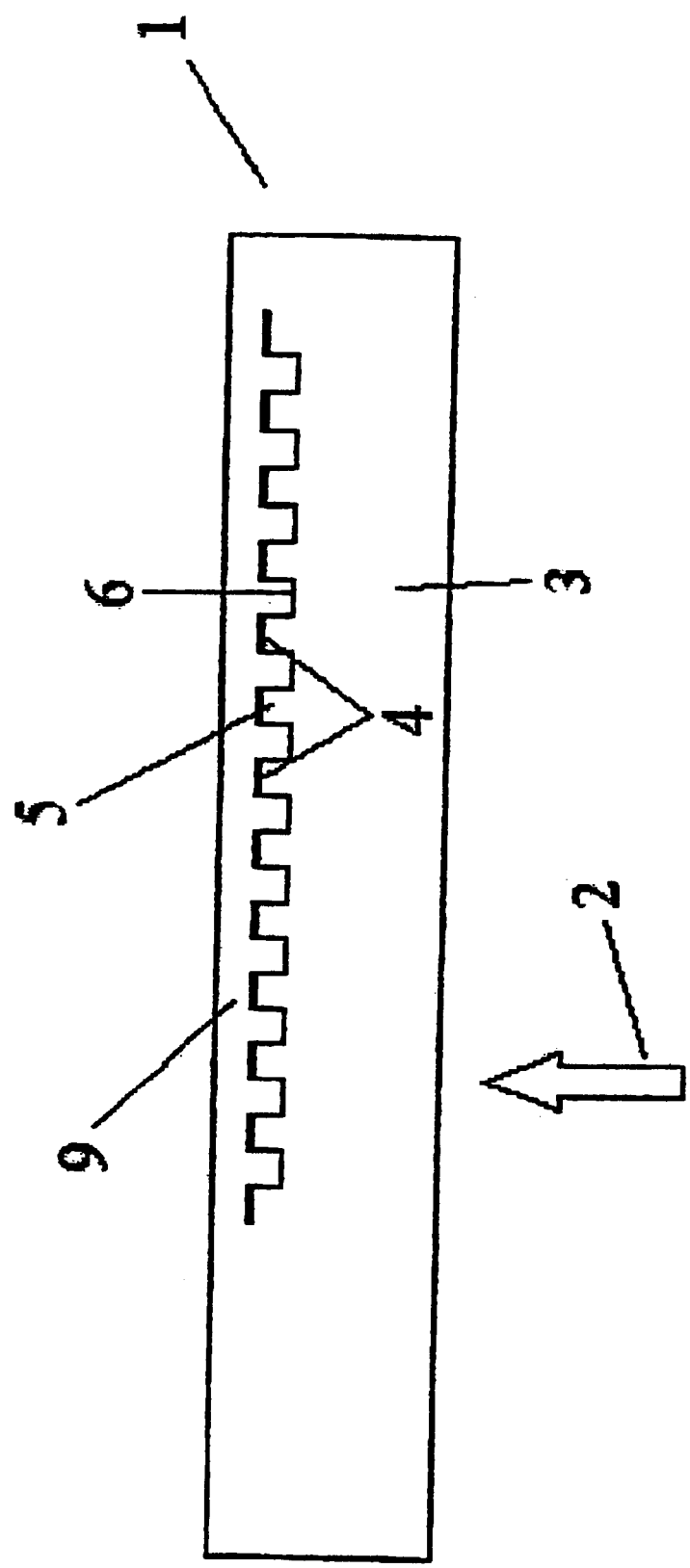
FIG. 1 illustrates the state of the prior art, wherein the figure shows the general structure of an optical disk; and, FIG. 2 illustrates the state of the prior art, wherein the figure shows the general structure of a pit-region and the surrounding land-region; and, FIG. 3 illustrates the state of the prior art, wherein the figure shows the general structure of rewriteable optical disk; and, FIG. 4 illustrates the state of the prior art, wherein the figure shows a schematic of the digital waveform which is obtained from reading an optical disk; and, FIG. 5 illustrates the state of the prior art, wherein the figure shows an example configuration of pit-regions and land-regions of a section of an optical disk; and, FIG. 6 illustrates a preferred embodiment of the present invention wherein, the figure shows a multi-layered structure imposed upon an optical disk.
Figure 2:
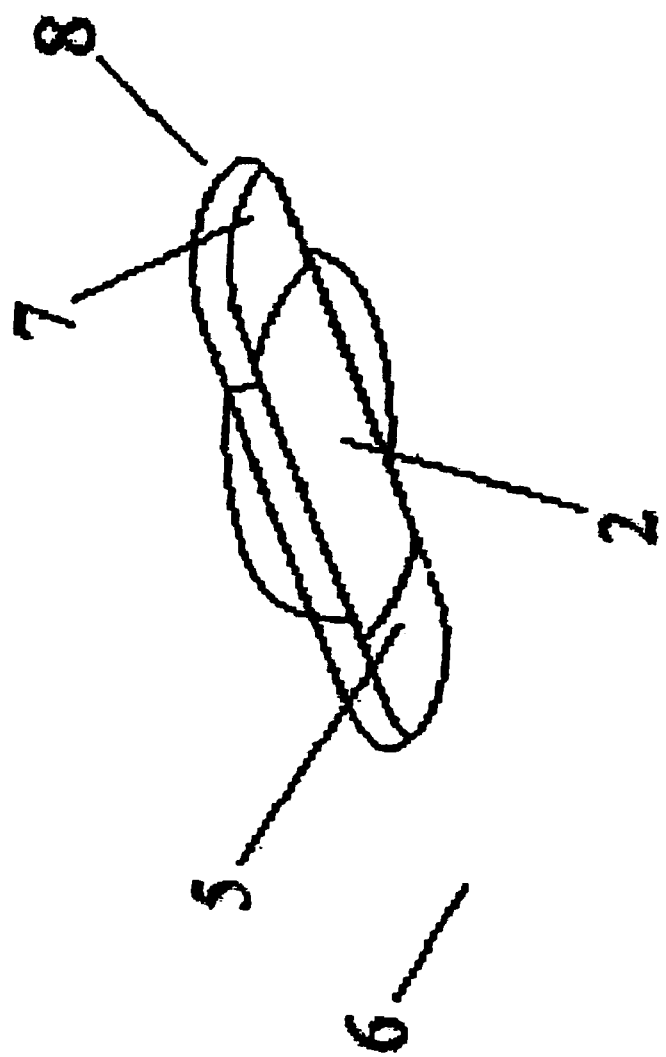
Figure 3:
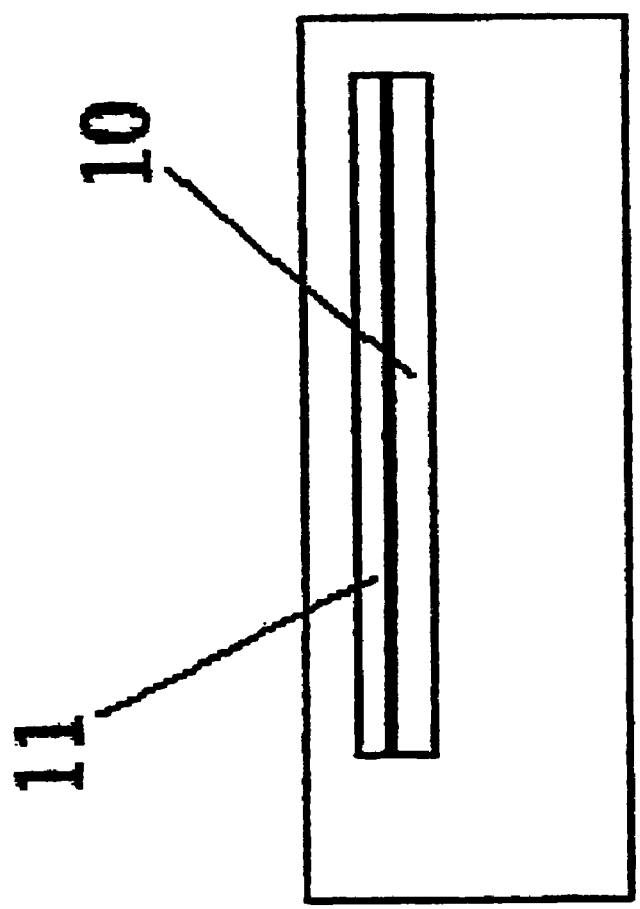
Figure 4:
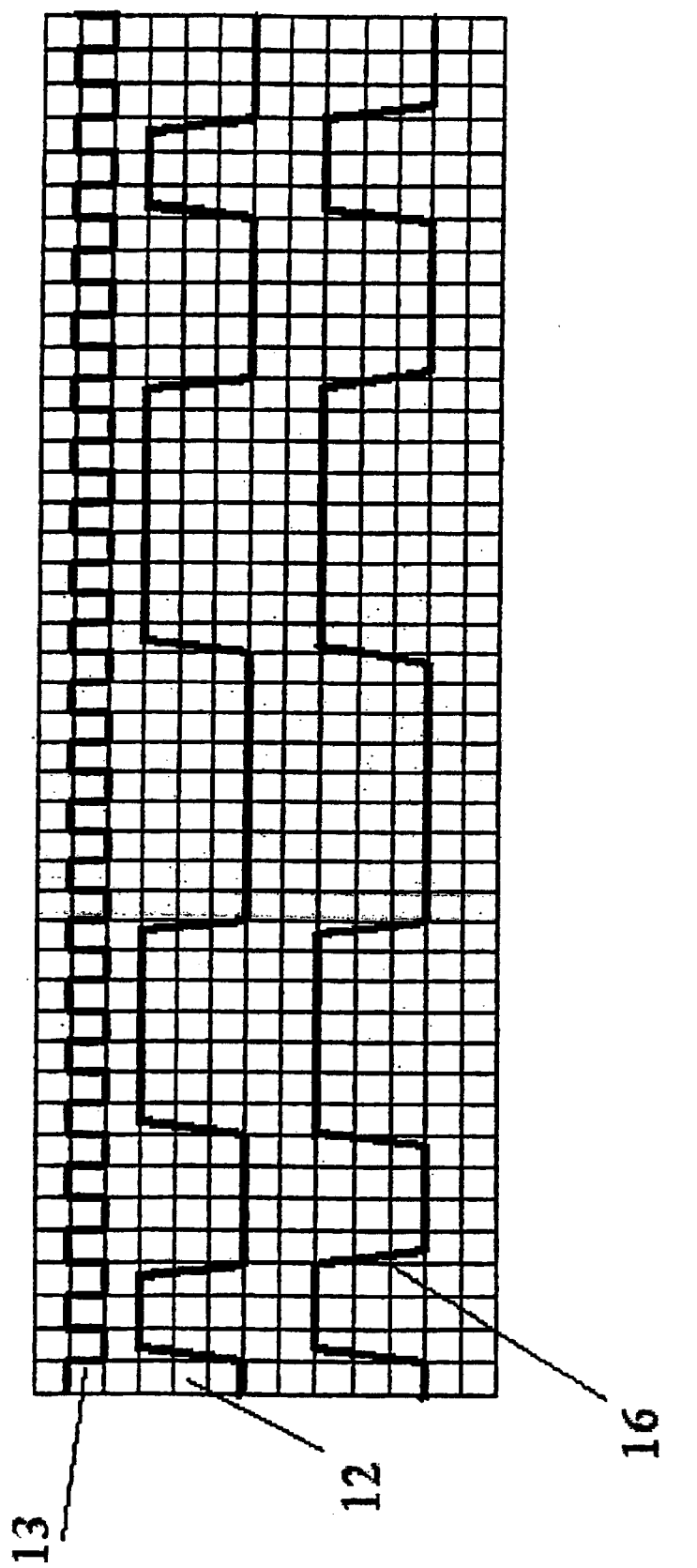

Generally, the digital waveform output 12 (voltage output by the photodiode) from opto-electronics reading an optical disk is shown in FIG. 4. The digital waveform output is not an ideal square wave 13, but is typically the waveform 12 wherein the rising and falling edges are sloped. During the disk manufacturing process, the pit 14 (shown in FIG. 5) is made by a cutting laser which is circular in cross-section, hence the ends of the pit 14 are semi-circular. Normally, in disk manufacturing, laser light is used to expose a photograph on a glass master plate. The laser light creates pits on the glass master plate which is then used to develop a negative stamp; the negative stamp is then used to press a single disk. Finally, a coating is used to cover the reflective metal on the data layer which allows the laser to discern the pit edges.

Figure 5:
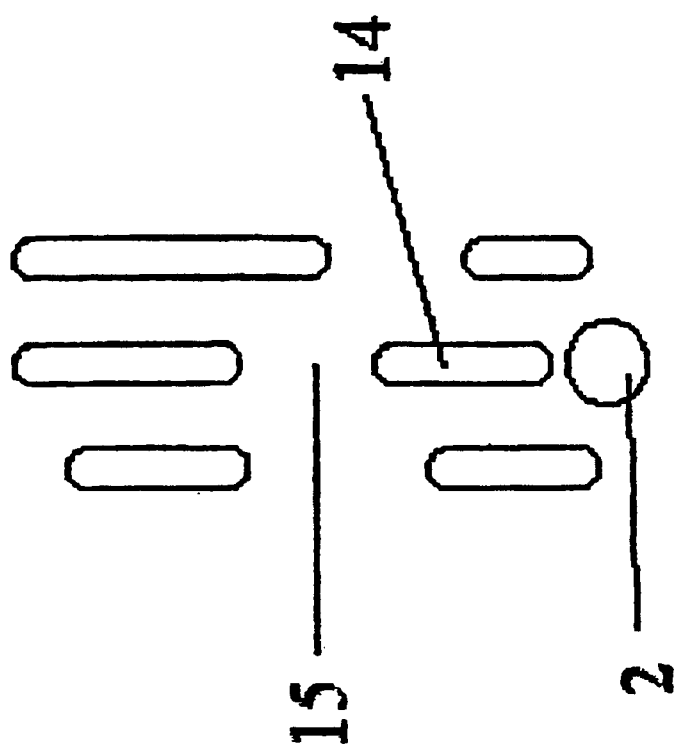

With reference to FIG. 5, as the laser light 2 passes over the pit 14, the curvature of the edge of the laser light 2 and the curvature of the edge of the pit 14 contribute to the sloping edge of the digital waveform output 12 of FIG. 4.

Typically, pits are separated by a land-region 15 having a different period from 3T to 11T, where T is some time period (normally the period of the master clock). Often, these land-region periods may vary by an error of 0.1T, 0.2T or more. Hence, the pit-length periods may become 3.1T, 3.2T or 3.9T, 3.8T, etc. as opposed to exactly 3T or 4T. As shown in FIG. 4, this situation gives rise to the digital waveform output 16 which is deviated from the digital waveform output 12, and further deviated from the ideal square waveform 13.

In the disk itself, the transparent surface, the pit- and land-regions, and the reflected layer are significantly uneven on a microscopic level. This contributes to the dither of reflected or refracted laser light which may induce errors in reading the pit-length and land-length information on the disk. Furthermore, laser light from the objective lens passes through air between the disk and the objective lens, then enters the spinning disk itself. Variations in the air properties, for example moisture, temperature etc., may also induce dither in the reflected or refracted laser light.

Moreover, the material of the disk may easily generate static electricity, which also effects the laser light reflection and refraction. When a significant amount of dither is induced in reflected or refracted laser light the photodiode may incorrectly detect pit-length periods or land-length periods.

Thus, a true pit-length period of 7T may be detected as 6T due to the preceding dither producing factors. Similarly, a land-length period of 7T may be detected as 8T. Such errors can cause erroneous and imprecise information to be read from the laser optical disk.

In addition to the previously mentioned errors, errors may be further induced by the actual components of the opto-electronic system employed to read a disk, including the disk transport and rotation devices. To take some specific examples, an analog Laserdisc spins at 600~1800 rpm, a DVD spins at 600~1600 rpm and CDs spin at 200~500 rpm. The identification T-length is 0.1333 $\mu$rpm (single layer) or 0.1467 $\mu$m (dual layer) for a DVD, and 0.3 $\mu$m for a CD. The laser scanning speed of a DVD is 3.49 m/s (single layer) or 3.84 m/s (dual layer), for a CDs it is 1.2~1.4 m/s. This means that for a DVD there is only $3.8\times10^{-8}$ s to identify a channel length by the photodiode. For a CD there is only $2.14\times10^{-7}$ s~$2.5\times10^{-7}$ s to identify a channel length by the photodiode. These are relatively short times for the circuitry to produce corresponding voltage outputs. In such a fast spinning environment it is difficult to make components with such precision and tolerances that errors are avoided.

There are many opportunities to improve the quality and precision of the electrical and mechanical attributes of the opto-electronic system. For example, isolating the power supply, removing ripples and smoothing the power supply, minimising radio frequency interference and isolating vibrations would improve the reading of the disk.

If disks are made by the same quality stamp but finished with different materials (e.g. aluminum, silver, gold, etc.) and different reflective coatings, or if the same master encoding is used to make two copies (one having normal space tracks the other having squeeze space tracks), then information obtained from the different disks may not be exactly the same. If variations between different types of optical disks supposedly storing the same information are to large then these different types of optical disks would be incompatible with each other which is an undesirable situation.

Having outlined the problems to be overcome, a preferred embodiment of the present invention is now disclosed which addresses some of the problems caused by dithering of reflected or refracted light, and by pit edge recognition.

A preferred, but non-limiting, embodiment of the present invention is hereinafter disclosed with reference to a DVD. However it should be noted that the present invention is not limited to this specific type of optical disk but should be taken to encompass all forms of optical disks including, but not limited to, analog disks, digital disks, recordable, rewriteable (magneto-optical) and other forms of optical disk. This includes variations of the standard CDs family of optical disks such as standard CD, Audio CD, CD-ROM, Video CD, CD-I, CD-R, CD-RW, Photo CD, CD-G, MovieCD, etc.

Figure 6:
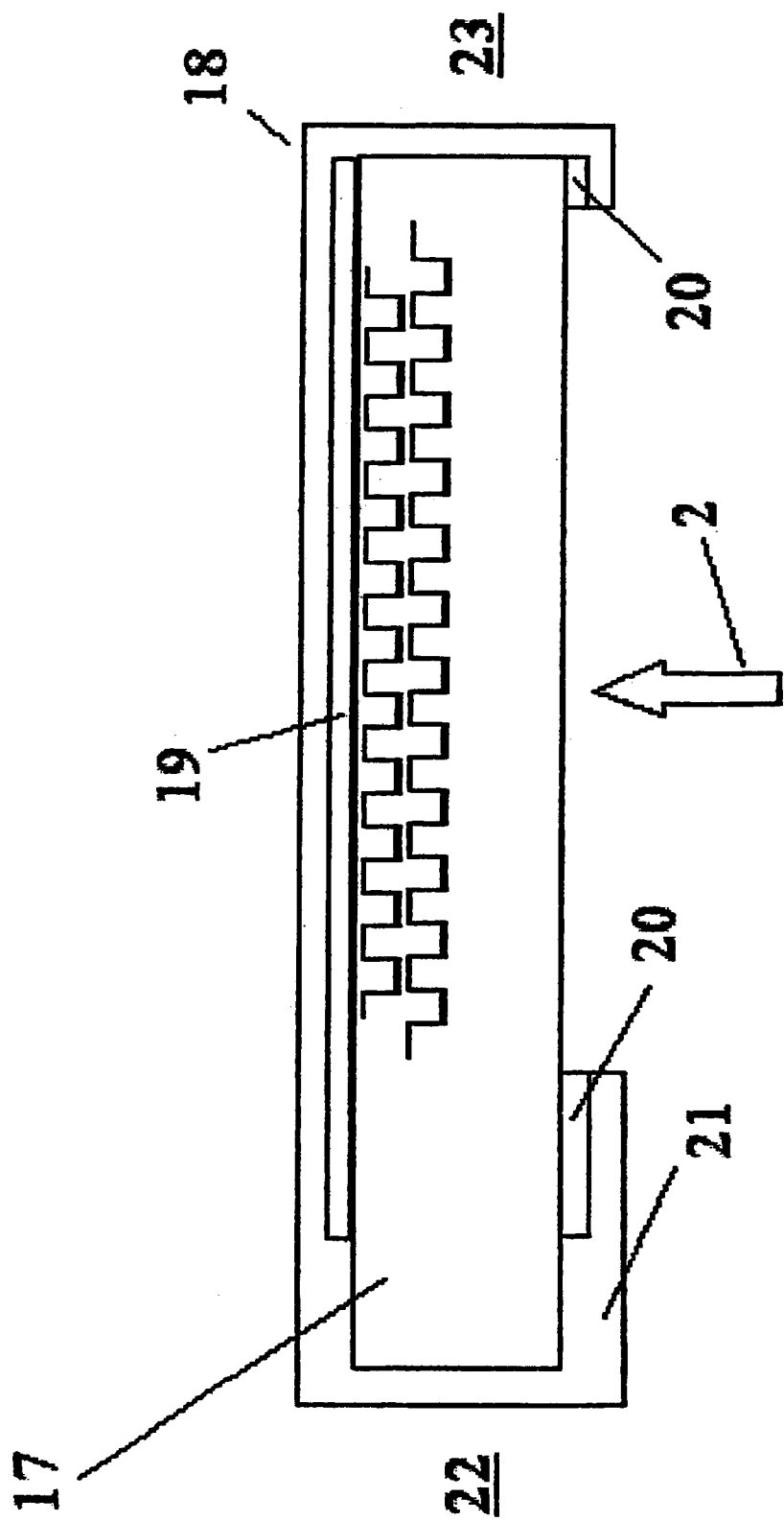

A preferred, but non-limiting, embodiment of the present invention is shown in FIG. 6. In this embodiment a single sided dual-layer DVD 17 is coated with a multi-layered structure 18. The centre of the DVD 17 is in the region shown by the numeral 22, whilst the outside edge of the DVD 17 is in the region shown by the numeral 23. Adjacent to the optical disk surface, and opposite to the source of the laser irradiation 2, a first layer of material 19 is deposited having a substantially red colour. Additionally, a material 20, which may be similar or the same as the material 19, is deposited outside of the pit region (and burst cutting area) on the same side as the source of the laser irradiation 2, as shown in FIG. 6.

Red is chosen as this is the corresponding wavelength of most laser light used in DVD systems. However, it should be noted that any colour of material may be used dependent upon the laser source. Furthermore, although a DVD has been described the present invention may be applied to all forms of optical disks.

Additional to this red layer, a second layer of material 21 of mixed green and blue colour is deposited in the regions as shown in the figure. As further clarification, the second layer of material 21 can contain green regions and blue regions as separate regions which in totality form the second layer of material 21. Reference to the term 'mixed' need not only refer to a single material having green and blue materials spread uniformly throughout, but also refers to separate materials forming the layer 21, one of substantially green colour and the other of substantially blue colour, which need not be placed in the same locations on the DVD. The material 21 (or materials 21) is deposited over the regions covered by the red layer, and also covering the disk in other regions except the pit region (and burst cutting area). These mixed green and blue regions can act as coding boundary identifiers.

In a specific embodiment of the present invention there is provided a device wherein the multi-chromatic layers are imposed upon the surface of a finished single side dual-layer DVD. However, it is possible to form the additional layers internally to the DVD. That is, during the manufacturing process of the DVD chromatic layers may be deposited at various locations prior to completing the manufacturing process. Likewise, chromatic layers may be formed by adding a material or materials to the DVD material itself during the manufacturing of the DVD.

The first layer of material 19 and the layers 20 are substantially red in colour so that they interact with the laser light, the laser light having a wavelength which is typically 650 nm and is thus in the red region of the visible spectrum. The second layer of material 21, which is substantially a mixture of green and blue in colour serves to reduce the intensity of laser light from undesirable sources, for example, reflection or refraction from opto-electronic components. By inhibiting such extraneous sources of light, noise levels from reading the optical disk should be reduced.

A specific embodiment of the present invention has been described in detail, however, the scope of the present invention should not be taken to be limited to the specific configuration of the materials on the optical disk (DVD in the embodiment), the number of layers of materials, the actual colours of the materials themselves, the order of layering the materials, or the means of depositing the materials amongst other factors. It should also be noted that the scale of the layers in the figures should be disregarded as layers are expanded in thickness for ease of illustration.

As a further example, a single layer of material only may enclose the periphery of an optical disk except for the region required so as laser light may access the area containing the pit encoding. Furthermore, this single layer need not be on the outside periphery of the optical disk but may be internal to the optical disk as long as the layer has an effect to shield the areas containing the pit encoding from extraneous laser light.

Numerous changes to the preferred embodiment can be made to construct further embodiments of the present invention. For example, the physical properties of the additional layers of material may be chosen so as to interact with a wide variety of laser light wavelengths, not only red light. Layers of material may be chosen to increase the reflectance or absorption of laser light of any wavelength, including laser light from the orange, yellow, green, blue, violet, ultraviolet and infrared regions of the spectrum. The layers of material may be configured in any position about or inside the optical disk, in any number of layers and in any thickness of each layer.

Various methods of applying the layers of material, either external or internal to the optical disk, may be envisaged. For example, semi-transparent, oblique, substantially transparent, filtering, absorbing or other like materials may be applied upon, or inside of, an optical disk by a multitude of means. Such means may include, but are not limited to, gluing, bonding, sticking, affixing, agglutinating, pasting, depositing or otherwise attaching the materials to the optical disk. Furthermore, the additional layers of material may be integrally formed within the optical disk during the manufacturing of the optical disk.

The single or multi-chromatic layer(s) are imposed upon the surface of or embedded within any format of optical disk. These optical disk technologies include, but are not limited to, any format of finished or unfinished, analog or digital, recorded (pressed) optical disk, recordable optical disk, rewriteable (magneto-optical) optical disk, and any future optical disk information storage medium.

The present invention according to the specific embodiment presented introduces additional layers 19, 20 and 21 over current optical disk technology. This allows the typically degrading dither light to be used as a useful dither light. The first layer of material 19 only reflects some of the dither light thus emphasising the pit reading, especially for an unqualified pit. The first layer of material 19 will not increase the reflectivity of the optical disk over current standard reflectivity specifications of optical disks. The rest of the dither light will pass through the first layer of material 19 and reach the second layer of material 21. Dither light originating from another source may proceed straight to the second layer of material 21 via the disk inside edge or outside edge. Thus it is recommended that the second layer of material has to eliminate these secondary sources of dither light.

These extra layers of material assist the laser pick-up system read the pit-length or land-length from the disk. They assist in eliminating the degrading dither light from the pick-up system.

Without degrading dither light reducing the play-back quality of an optical disk, disk manufacturers can squeeze the data tracks on the current formats of optical disks. Not only may more information be stored in such altered disks than is currently able to be stored, but the altered disks will be able to more compactly store the same amount of data.

It will be understood that, whilst a very specific embodiment has been described, numerous other variations and modifications of the invention will become apparent to persons skilled in the art. All such variations and modifications should be considered to fall within the scope of the invention as broadly hereinbefore described and as hereinafter claimed.

The claims defining the invention are as follows:

1. An improved optical disk device including:
   an optical disk;
   a first layer of material disposed upon at least a portion of the surface of the optical disk opposite to a laser source, the first layer of material able to substantially reflect laser light from the laser source;

a second layer of material(s) disposed over at least the first layer of material, the second layer of material(s) able to substantially absorb the laser light; and a third layer of material disposed upon at least a portion of the surface of the optical disk adjacent to the laser source, the third layer of material able to substantially reflect laser light from the laser source.

2. A device as claimed in claim 1 wherein:

the first layer of material covers an area of the surface of the optical disk corresponding to at least the region of the optical disk used for pit encoding; and the second layer of material(s) covers at least the first layer of material and the third layer of material.

3. A device as claimed in either claim 1 or claim 2 wherein, the third layer of material is excluded from the surface area of the optical disk required by the laser source to access the region of the optical disk containing the pit encoding.

4. A device as claimed in claim 1 or 2 wherein, the second layer of material(s) is also disposed upon at least part of the lateral edges of the optical disk.

5. A device as claimed in claim 1 or 2 wherein:

the first layer of material is substantially red in colour;

the second layer of material(s) is substantially green, blue or combinations thereof in colour(s);

the third layer of material is substantially red in colour.

6. A device as claimed in claim 1 or 2 wherein, the layers of materials are embedded within the optical disk in regions or areas thus providing a similar effect as if the layers were disposed upon the surface of the optical disk.

7. A method of reducing errors when an opto-electronic system reads an optical disk, said method including the steps of:

depositing a first layer of material upon at least a portion of the surface of the optical disk opposite to a laser source, the first layer of material able to substantially reflect laser light from the laser source;

depositing a second layer of material(s) over at least the first layer of material, the second layer of material(s) able to substantially absorb the laser light; and depositing a third layer of material upon at least a portion of the surface of the optical disk adjacent to the laser source, the third layer of material able to substantially reflect laser light from the laser source;

whereby the presence of the first, second and third layers of materials facilitates increased recognition of pit edges by the opto-electronic system than would otherwise be obtained if the layers of materials were not present.

8. A method as claimed in claim 7 wherein:

the first layer of material covers an area of the surface of the optical disk corresponding to at least the region of the optical disk used for pit encoding; and the second layer of material(s) covers at least the first layer of material and the third layer of material.

9. A method as claimed in claim 7 or claim 8 wherein, the third layer of material is excluded from the surface area of the optical disk required by the laser source to access the region of the optical disk containing the pit encoding.

10. A method as claimed in claim 7 or 8 wherein, the second layer of material(s) is also disposed upon at least part of the lateral edges of the optical disk.

11. A method as claim in claim 7 wherein:

the first layer of material is substantially red in colour;

the second layer of material(s) is substantially green, blue or combinations thereof in colour(s)

the third layer of material is substantially red in colour.

12. A method as claimed in claim 7 wherein, the layers of materials are embedded within the optical disk in regions adjacent the surface of the optical disk.

13. The device as claimed in claim 1 wherein, the optical disk includes standard, pressed (pre-recorded), recordable, rewritable (magneto-optical) or other forms of optical disk.

14. An improved optical disk device including:

an optical disk;

a first layer of material disposed upon at least a portion of the surface of the optical disk, the first layer of material able to substantially reflect laser light from a laser source;

a second layer of material(s) disposed adjacent to the first layer of material, the second layer of material(s) disposed upon at least a portion of the surface of the optical disk, the second layer of material(s) able to substantially absorb the laser light.

15. An optical disk device as claimed in claim 14 wherein, the first layer of material is red, and the second layer of material is blue.

\* \* \* \* \*